US011360937B2

(12) United States Patent
Shukes et al.

(10) Patent No.: US 11,360,937 B2
(45) Date of Patent: Jun. 14, 2022

(54) SYSTEM FOR NATURAL LANGUAGE PROCESSING-BASED ELECTRONIC FILE SCANNING FOR PROCESSING DATABASE QUERIES

(71) Applicant: Bank of America Corporation, Charlotte, NC (US)

(72) Inventors: Scott Charles Shukes, Charlotte, NC (US); William P. Jacobson, Matthews, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 20 days.

(21) Appl. No.: 16/825,581

(22) Filed: Mar. 20, 2020

(65) Prior Publication Data

US 2021/0294776 A1  Sep. 23, 2021

(51) Int. Cl.
G06F 16/14 (2019.01)
G06F 16/11 (2019.01)
G06F 16/2457 (2019.01)

(52) U.S. Cl.
CPC .......... *G06F 16/148* (2019.01); *G06F 16/116* (2019.01); *G06F 16/156* (2019.01); *G06F 16/24578* (2019.01)

(58) Field of Classification Search
CPC ............. G06F 11/1451; G06F 9/45558; G06F 16/128; G06F 2201/84; G06F 2009/45583; G06F 2201/815; G06F 16/188; G06F 11/1448; G06F 11/1464; G06F 11/1484
See application file for complete search history.

(56) References Cited

U.S. PATENT DOCUMENTS

| 1,019,192 A | 3/1912 | Schick |
| 7,505,989 B2 | 3/2009 | Gardner et al. |
| 8,065,307 B2 | 11/2011 | Haslam et al. |
| 8,447,604 B1 | 5/2013 | Chang |
| 9,286,290 B2 | 3/2016 | Allen et al. |
| 9,501,475 B2 | 11/2016 | Agrawal et al. |

(Continued)

OTHER PUBLICATIONS

DatabaseDev, Database Design & Normalization, Oct. 28, 2012, p. 1-3, retrieved from the internet URL: http://web.archive.org/web/20121028064111/http://www.databasedev.co.uk/database_normalization_basics.html, [retrieved on Jun. 3, 2021] (Year: 2012).*

(Continued)

*Primary Examiner* — Pierre M Vital
*Assistant Examiner* — Vy H Ho
(74) *Attorney, Agent, or Firm* — Moore & Van Allen PLLC; Seongun M. Hong

(57) ABSTRACT

A system for natural language processing-based electronic file scanning for processing database queries is provided. In particular, the system may use natural language processing on various types of lookup data to create a consolidated lookup file containing the lookup data. The system may then receive search queries from users and produce a search output based on the consolidated lookup file. Once the search output is provided to the user, the system may, based on the user's interaction with the search output, incorporate the original search query into the consolidated lookup data file using machine learning. In this way, the system may adapt to incorporate variations and nuances of search queries received from its users over time.

11 Claims, 2 Drawing Sheets

(56) References Cited

U.S. PATENT DOCUMENTS

| | | | |
|---|---|---|---|
| 9,519,859 | B2 | 12/2016 | Huang et al. |
| 9,535,960 | B2 | 1/2017 | Guo et al. |
| 9,870,591 | B2 | 1/2018 | Shah |
| 10,354,182 | B2 | 7/2019 | Chang et al. |
| 10,504,626 | B2 | 12/2019 | Hayter, II |
| 11,003,645 | B1 * | 5/2021 | Thompson ............ G06F 16/906 |
| 2013/0006764 | A1 * | 1/2013 | Zhang .................... G06Q 30/02 705/14.52 |
| 2013/0273968 | A1 | 10/2013 | Rhoads et al. |
| 2014/0365242 | A1 | 12/2014 | Neff |
| 2015/0161255 | A1 * | 6/2015 | Battle ..................... H04L 67/30 707/706 |
| 2015/0269139 | A1 | 9/2015 | McAteer et al. |
| 2016/0188730 | A1 * | 6/2016 | Delli Santi ........... G06F 16/235 707/728 |
| 2016/0364490 | A1 | 12/2016 | Maugans, III |
| 2016/0373891 | A1 * | 12/2016 | Ramer .................. H04W 4/024 |
| 2017/0091320 | A1 | 3/2017 | Psota et al. |
| 2017/0199875 | A1 * | 7/2017 | Nevrekar .......... G06F 16/24553 |
| 2018/0336206 | A1 | 11/2018 | Wan et al. |
| 2019/0114348 | A1 | 4/2019 | Gao et al. |
| 2019/0188295 | A1 | 6/2019 | Sirotkovic et al. |
| 2019/0286978 | A1 | 9/2019 | Aggarwal et al. |
| 2020/0192951 | A1 * | 6/2020 | Singhal ............... G06F 16/9535 |

OTHER PUBLICATIONS

Geir Hoydalsvik, MySQL 8.0: From SQL Tables to JSON Documents, Apr. 17, 2018, p. 1-3, retrieved from the Internet URL: http://web.archive.org/web/20180101000000*/https://mysqlserverteam.com/mysql-8-0-from-sql-tables-to-json-documents-and-back-again/, [retrieved on Jun. 3, 2021] (Year: 2018).*

Hema Yoganarasimhan; Management Science; Search Personalization Using Machine Learning; downloaded Jul. 5, 2020; https://faculty.washington.edu/hemay/search_personalization.pdf; Publisher: Institute for Operations Research and the Management Sciences (INFORMS) INFORMS is located in Maryland, USA; 27 pages.

* cited by examiner

SYSTEM FOR NATURAL LANGUAGE PROCESSING-BASED ELECTRONIC FILE SCANNING FOR PROCESSING DATABASE QUERIES

FIELD OF THE INVENTION

The present disclosure embraces a system for adaptive natural language processing-based electronic file scanning for processing database queries.

BACKGROUND

There is a need for an efficient and effective way to process database queries.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for natural language processing-based electronic file scanning for processing database queries. In particular, the system may use natural language processing on various types of lookup data to create a consolidated lookup file containing the lookup data. The system may then receive search queries from users and produce a search output based on the consolidated lookup file. Once the search output is provided to the user, the system may, based on the user's interaction with the search output, incorporate the original search query into the consolidated lookup data file using machine learning. In this way, the system may adapt to incorporate variations and nuances of search queries received from its users over time.

Accordingly, embodiments of the present disclosure provide a system for adaptive natural language processing-based electronic file scanning for processing database queries. The system may comprise a memory device with computer-readable program code stored thereon; a communication device; and a processing device operatively coupled to the memory device and the communication device, wherein the processing device is configured to execute the computer-readable program code to extract, using natural language processing, lookup data from one or more data files stored on one or more computing systems in a network; aggregate the lookup data into a consolidated lookup data file comprising the lookup data; receive a search query from a user computing system, wherein the search query comprises a search term; in response to the search query, display a search output to the user computing system, the search output comprising one or more search results; monitor user activity associated with the search output; and based on the user activity, associate the search term with the lookup data corresponding to the one or more search results.

In some embodiments, the consolidated lookup data file is stored in a relational format, wherein associating the search term with the one or more search results comprises appending the search term to a new column in a row containing the lookup data corresponding with the one or more search results.

In some embodiments, the consolidated lookup data file is stored in a relational format, wherein associating the search term with the one or more search results comprises appending the search term to a new row, wherein the new row is linked with a row containing the lookup data corresponding with the one or more search results via a key.

In some embodiments, the consolidated lookup data file is stored in a non-relational format, wherein associating the search term with the one or more search results comprises appending the search term to the lookup data corresponding with the one or more search results via a new key-value.

In some embodiments, the computer-readable program code further causes the processing device to determine a level of relevance of the one or more search results to the search query based on the user activity.

In some embodiments, the user activity comprises at least one of downloading an entry within the one or more search results or viewing metadata associated with the entry.

In some embodiments, the one or more search results are sorted by relevance to the search query.

Embodiments of the present disclosure also provide a computer program product for adaptive natural language processing-based electronic file scanning for processing database queries. The computer program product may comprise at least one non-transitory computer readable medium having computer-readable program code portions embodied therein, the computer-readable program code portions comprising executable code portions for extracting, using natural language processing, lookup data from one or more data files stored on one or more computing systems in a network; aggregating the lookup data into a consolidated lookup data file comprising the lookup data; receiving a search query from a user computing system, wherein the search query comprises a search term; in response to the search query, displaying a search output to the user computing system, the search output comprising one or more search results; monitoring user activity associated with the search output; and based on the user activity, associating the search term with the lookup data corresponding to the one or more search results.

In some embodiments, the consolidated lookup data file is stored in a relational format, wherein associating the search term with the one or more search results comprises appending the search term to a new column in a row containing the lookup data corresponding with the one or more search results.

In some embodiments, the consolidated lookup data file is stored in a relational format, wherein associating the search term with the one or more search results comprises appending the search term to a new row, wherein the new row is linked with a row containing the lookup data corresponding with the one or more search results via a key.

In some embodiments, the consolidated lookup data file is stored in a non-relational format, wherein associating the search term with the one or more search results comprises appending the search term to the lookup data corresponding with the one or more search results via a new key-value.

In some embodiments, the computer-readable code portions further comprise executable code portions for determining a level of relevance of the one or more search results to the search query based on the user activity.

In some embodiments, the user activity comprises at least one of downloading an entry within the one or more search results or viewing metadata associated with the entry.

Embodiments of the present disclosure also provide a computer-implemented method for adaptive natural language processing-based electronic file scanning for processing database queries, wherein the computer-implemented method comprises extracting, using natural language processing, lookup data from one or more data files stored on one or more computing systems in a network; aggregating the lookup data into a consolidated lookup data file comprising the lookup data; receiving a search query from a user computing system, wherein the search query comprises a search term; in response to the search query, displaying a search output to the user computing system, the search output comprising one or more search results; monitoring user activity associated with the search output; and based on the user activity, associating the search term with the lookup data corresponding to the one or more search results.

In some embodiments, the consolidated lookup data file is stored in a relational format, wherein associating the search term with the one or more search results comprises appending the search term to a new column in a row containing the lookup data corresponding with the one or more search results.

In some embodiments, the consolidated lookup data file is stored in a relational format, wherein associating the search term with the one or more search results comprises appending the search term to a new row, wherein the new row is linked with a row containing the lookup data corresponding with the one or more search results via a key.

In some embodiments, the consolidated lookup data file is stored in a non-relational format, wherein associating the search term with the one or more search results comprises appending the search term to the lookup data corresponding with the one or more search results via a new key-value.

In some embodiments, the method further comprises determining a level of relevance of the one or more search results to the search query based on the user activity.

In some embodiments, the user activity comprises at least one of downloading an entry within the one or more search results or viewing metadata associated with the entry.

In some embodiments, the one or more search results are sorted by relevance to the search query.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
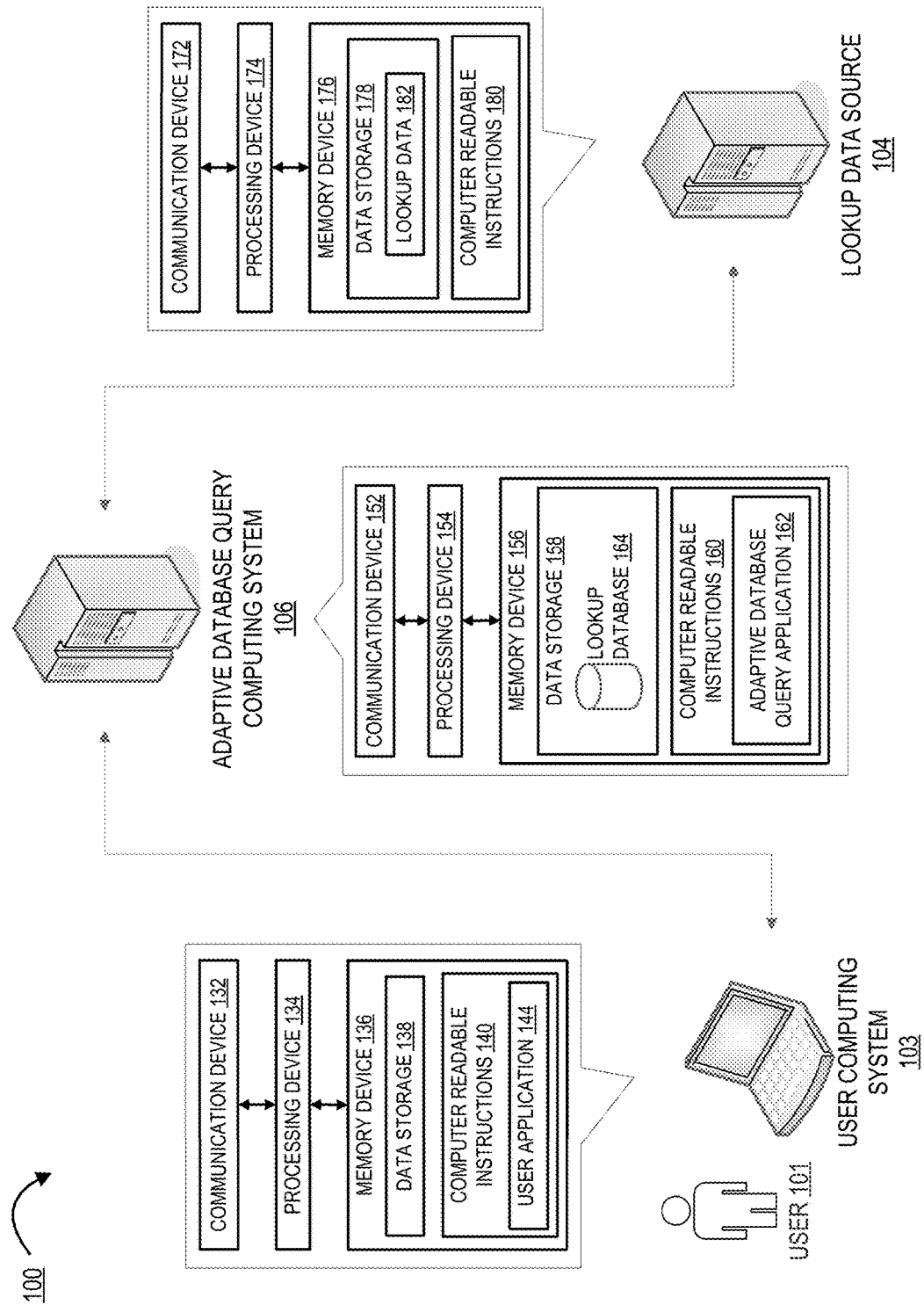
Figure 2:
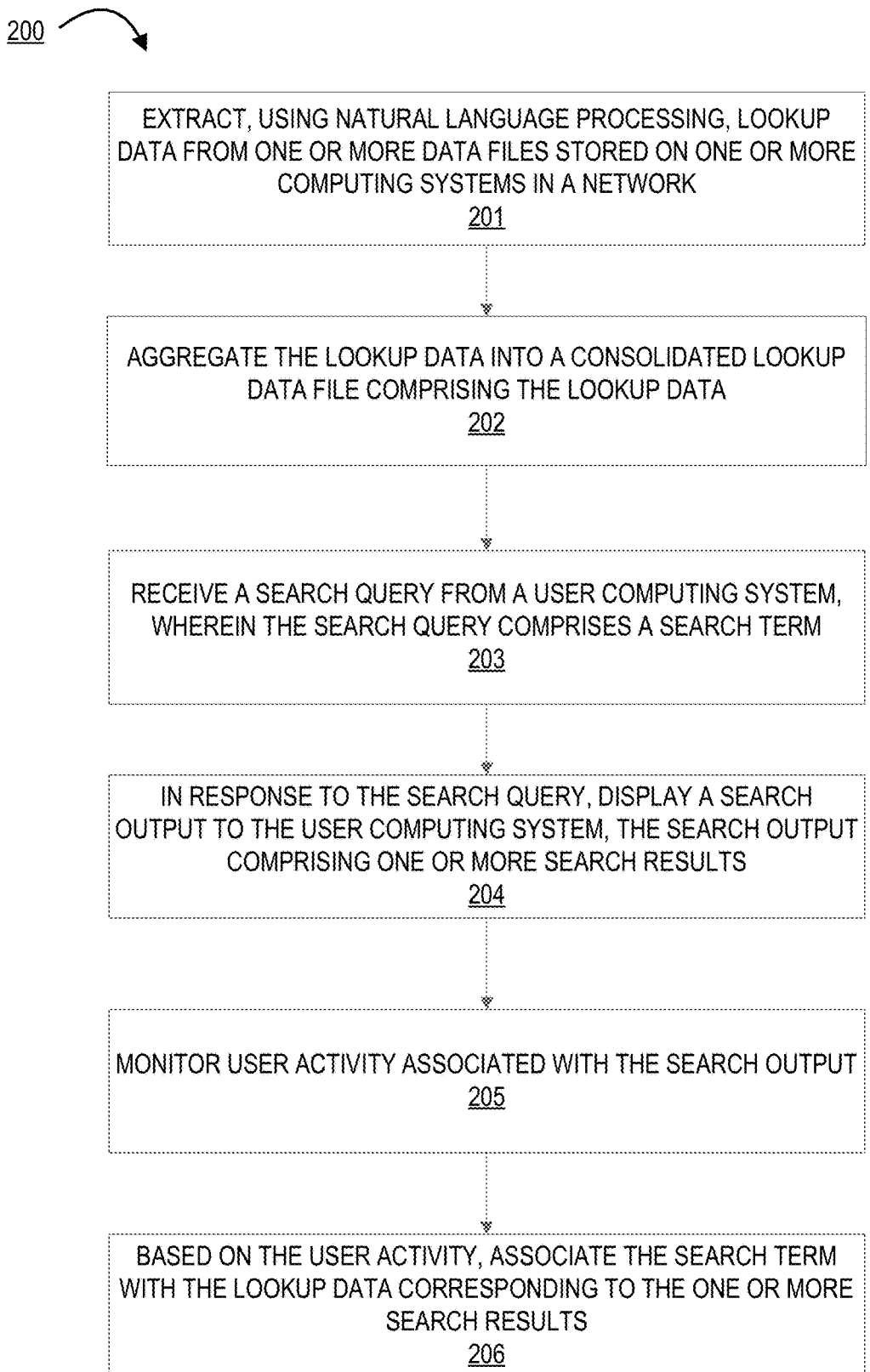

Having thus described embodiments of the invention in general terms, reference will now be made to the accompanying drawings, wherein:

FIG. 1 illustrates an operating environment for the adaptive database query processing system, in accordance with one embodiment of the present disclosure; and FIG. 2 illustrates a process flow for the adaptive database query processing system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Natural language processing" or "NLP" as used herein may refer to the set of artificial intelligence-based processes used by a computing system to process and analyze data containing natural language information. In this regard, NLP may include processes to understand and generate natural language data.

An entity's networked environment may comprise various types of data (which may be referred to herein as "lookup data") that the entity may wish to provide in response to search queries submitted by its users. Such lookup data may be found in databases, electronic documents (e.g., document files), tables, spreadsheets, and the like (which may be referred to herein as "lookup data sources"). In this regard, the system may use NLP to extract the relevant lookup data from the lookup data sources and subsequently merge the extracted lookup data into a consolidated lookup data file. The lookup data and/or the consolidated lookup data file may be stored on a relational database (e.g., a SQL database) or non-relational database (e.g., a NoSQL database). Once the consolidated lookup data file is generated, the system may receive a search query from a user. Based on the search query, the system may retrieve one or more data entries from the consolidated lookup data file and generate a search output (e.g., search results) containing the one or more data entries to be presented to the user.

Once the search output is presented to the user, the system may monitor the user's interactions with the search output and/or the search results. For instance, the system may track the user's activity with respect to a particular search result (e.g., tagging the result as "relevant," saving the result for later use, the rank/order in which the particular search result appeared within the search output, or the like), the time spent by the user in reviewing the search output, or other user actions (e.g., the user's download activity with respect to the search output). Based on the user's activity, the system may determine that the search output or certain results within the search output were more relevant to the user's query than others. Accordingly, the system may store search queries submitted by users and/or the lookup data/search results to which the search queries relate (e.g., within the consolidated lookup file). In response to subsequent search queries, the system may search the lookup data in addition to previous search queries and the results from such search queries.

In some embodiments (e.g., in a relational database), the search queries and/or the results of the search queries may be appended to the lookup data (e.g., as a new data element within the consolidated lookup data file). In such embodiments, the search queries may be stored in a row with the relevant lookup data with a delineation separating the search queries from the lookup data. In other embodiments, the search query may be stored separately but linked with the lookup data (e.g., as a new row within the consolidated lookup data file). In such embodiments, the search queries may be linked to particular entries via a key or other identifier. In yet other embodiments (e.g., in a non-relational database), the search queries may be stored in a separate file from the consolidated lookup data file and linked to particular entries within the consolidated lookup data file.

An exemplary use case is provided as follows for illustrative purposes. In one embodiment, the lookup data may contain information about an organization's office locations. In this regard, the lookup data may be found in various types of data files within the network environment. For instance, the lookup data may be found in office databases, document data files, e-mail archives, or the like. Accordingly, the system may extract and aggregate the lookup data using NLP to generate a consolidated lookup data file which contains a consolidated list of office locations for the particular organization. The consolidated lookup data file may be stored using a relational data model (e.g., a table with columns and rows), where the columns may represent various attributes of each office location (e.g., name or identifier, address, phone number, e-mail address, and the like).

Once the consolidated lookup data file is generated, the system may receive user-provided search queries for office locations. For example, if the user wishes to search for office locations in New York, the search query may include a search string such as "New York," "NY," "N.Y.," "NYC," or other such variations. In some embodiments, the search string may include a misspelling or incomplete query (e.g., "NCY" or "N York"). In response to the search query, the system may provide to the user a search output containing one or more entries from the consolidated lookup data file, where such entries may be selected based on their name or identifier (e.g., the name of the location is related to New York), address (e.g., the physical location is in New York), or the like.

Upon providing the search output to the user, the system may monitor user activity with respect to the results in the search output. For instance, if the user selects a certain entry (e.g., the first result in the search output), the system may be increase a confidence level in the relevance of the search output. If, on the other hand, the user submits a subsequent related search query, the system may decrease the confidence level in the relevance of the search output. Subsequently, through AI-based analysis, the system may append and/or link the user's search query to the entry marked or selected by the user. For instance, if the user searched for "N.Y." and selected the first result in the search output (e.g., by clicking, touching, performing a mouseover, exporting contact information, or otherwise interacting with the search result), the query of "N.Y." may be linked to the first result even if the lookup data associated with the first result does not contain "N.Y." itself.

The system as described herein confers a number of technological advantages over conventional database systems. For instance, by using NLP technology to aggregate lookup data, the system may provide an efficient, up-to-date repository of the lookup data existing within the network environment without the need to add or modify code. Furthermore, through machine learning mechanisms, the system may continuously and dynamically adjust search outputs and account for nuances and discrepancies in the way that users may express certain concepts when submitting search queries, thereby increasing the accuracy of provided such results and reducing the need to submit multiple queries to find the relevant lookup data. In turn, by reducing the need to submit multiple queries, the system may avoid the computing inefficiencies associated with processing unnecessary or redundant search queries.

Turning now to the figures, FIG. 1 illustrates an operating environment 100 for the adaptive database query processing system, in accordance with one embodiment of the present disclosure. In particular, FIG. 1 illustrates an adaptive database query computing system 106 that is operatively coupled, via a network, to a user computing system 103 and a lookup data source 104. In such a configuration, the adaptive database query computing system 106 may, in some embodiments, transmit information to and/or receive information from the user computing system 103 and/or the lookup data source 104. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the user computing system 103 and the lookup data source 104 are each depicted as single units, the operating environment may comprise multiple user computing systems and multiple lookup data sources 106 that may transmit data to and from the adaptive database query computing system 106.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the adaptive database query computing system 106 may be a computing system that performs the lookup data aggregation, search query processing, and adaptive machine learning processes as described elsewhere herein. Accordingly, the adaptive database query computing system 106 may comprise a communication device 152, a processing device 154, and a memory device 156. The adaptive database query computing system 106 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 may be operatively coupled to the communication device 152 and the memory device 156 such that the processing device 154 uses the communication device 152 to communicate with the network and other devices on the network, such as, but not limited to the user computing system 103 and the lookup data source 104. In this regard, the communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of an adaptive database query application 162, which may comprise computer-executable program code which may instruct the processing device 154 to perform certain logic, data processing, and data storing functions of the application to accomplish the entity's objectives. For instance, the adaptive database query application 162 may allow the entity system to receive database queries from the user computing system 103, retrieve and aggregate data from the lookup data source 104, and the like.

In some embodiments, the memory device 156 includes data storage 158 for storing data related to the system environment. In this regard, the data storage 158 may comprise a lookup database 164, which may include various types of data processed by the adaptive database query computing system 106. In an exemplary embodiment, the lookup database 164 may comprise lookup data retrieved and aggregated from various lookup data sources 106 within the network environment. Such lookup data may further be combined into a consolidated lookup data file by the adaptive database query computing system 106. It should be understood that in alternative embodiments, the lookup database 164 may be hosted on a separate computing system (e.g., a database server) instead of being hosted on the adaptive database query computing system 106.

As further illustrated in FIG. 1, the operating environment 100 may further comprise a user computing system 103 in operative communication with the adaptive database query computing system 106. The user computing system 103 may be a computing system that is operated by a user 101, such as an administrator, agent, or employee of the entity. In other embodiments, the user 101 may be a user which is external to the entity, such as a customer or client of the entity. Accordingly, the user computing system 103 may be a device such as a desktop computer, laptop, IoT device, smartphone, tablet, single-board computer, or the like. The user computing system 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 103 may comprise a processing device 134 operatively coupled to a communication device 132 and a memory device 136 having data storage 138 and computer readable instructions 140 stored thereon. The computer readable instructions 140 may comprise a user application 144 which may receive inputs from the user 101 and produce outputs to the user 101. In particular, the user application 144 may be used by the user 101 to submit search queries for lookup data to and receive search output/results from the adaptive database query computing system 106.

The operating environment 100 may further comprise a lookup data source 104. The lookup data source 104 may be a computing system that may host data to be aggregated and used by the adaptive database query computing system 106. In this regard, the lookup data source 104 may be any type of computing system as described herein within the networked environment. Accordingly, the lookup data source 104 may comprise a processing device 174 operatively coupled to a communication device 172 and a memory device 176 comprising data storage 178 and computer readable instructions 180. The data storage 178 may have lookup data 182 stored therein, where the lookup data 182 may be retrieved and aggregated by the adaptive database query computing system 106 into a consolidated lookup data file to be subsequently used to respond to search queries submitted by the user 101.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for the adaptive database query processing system, in accordance with some embodiments of the present disclosure. The process 200 begins at block 201, where the system extracts, using natural language processing, lookup data from one or more data files stored on one or more computing systems in a network. The lookup data may be the data that an entity wishes to make searchable. In this regard, the lookup data may be found within data files (e.g., plaintext files, document files, spreadsheets, and the like) which may be stored on various computing systems in the entity's network environment. Accordingly, the lookup data extraction process may be accomplished by scanning the computing systems for the lookup data. In some embodiments, the scan may be completed manually (e.g., on demand). In other embodiments, the scan may be executed automatically on a continuous or periodic basis. Once the lookup data is found, a lookup data file may be generated for each item of lookup data scanned by the system.

The process continues to block 202, where the system aggregates the lookup data into a consolidated lookup data file comprising the lookup data. The consolidated lookup data file may be generated by aggregating the lookup data files using a relational format (e.g., a table with columns and rows) or non-relational format (e.g., graph with nodes and edges) with entries for each element within the lookup data. For instance, the lookup data may comprise office locations for a particular organization. In such an embodiment, each office location may be an element which is assigned an entry within the consolidated lookup data file. Accordingly, the consolidated lookup data file may in such embodiments comprise a consolidated list of office locations to be used in response to search queries received from the user. For example, if the consolidated lookup data file is stored in a relational format, the columns may contain various types of information about each entry (e.g., office name, address, status, open date, or the like) whereas each row may correspond to a particular office location. The consolidated lookup data file may further be updated with new lookup data that may be discovered in subsequent scans as described above.

The process continues to block 203, where the system receives a search query from a user computing system, wherein the search query comprises a search term. Continuing the above example, the search query may be a request from the user to search for a particular office location. For instance, if the user wishes to search for office locations in New York, then the search term may be "New York," "NY," or the like. In other embodiments, a search term may contain an uncommon spelling or typographical error (e.g., "NewYork" or "New Yrok") or a word that may be related to the location (e.g., "Manhattan"). Based on receiving the search query, the system may scan the consolidated lookup data file for entries that the system determines are relevant to the user's search query (e.g., by cosine vectorization or the like). For instance, the system may return entries that at least partially match the search terms of the search query or entries that have been associated with the search terms.

The process continues to block 204, where the system, in response to the search query, display a search output to the user computing system, the search output comprising one or more search results. The search results may take the form of an itemized list of one or more entries that the system has identified that may be relevant to the user's search query. The search results may be, for instance, presented on a display device of the user computing system. In this regard, the one or more entries may be sorted according to their relevance to the search query such that the most relevant entries appear near the top of the search results. Each entry within the list may contain one or more interactive elements (e.g., selectable buttons, links, or the like) which may provide additional information related to the entry (e.g., contact information of the office location, location mapping feature, turn-by-turn directions, saving/downloading data and/or metadata, or the like) and/or allow the user to provide feedback related to the entry (e.g., marking the entry as relevant/not relevant, comments, or the like).

The process continues to block 205, where the system monitors user activity associated with the search output. In this regard, the system may track with which entries the user has interacted (e.g., downloading data/metadata associated with an entry, saving an entry to a personal "favorites" list, or the like), how long the user has spent reviewing the results, how many queries the user submits before concluding the search, and the like. Based on such information, the system may determine the level of relevance of the search results displayed to the user. For instance, if the user spends relatively little time reviewing the results before saving the top entry in the search results and subsequently does not submit additional search queries, the system may determine that the first search result had a high level of relevance to the user's initial query. Conversely, if the user spends a relatively longer time reviewing the search results and submits an additional search query without interacting with any of the entries in the search results, the system may determine that the entries provided within the search results have a relatively lower level of relevance to the user's initial search query.

The process concludes at block 206, where the system, based on the user activity, associates the search term with the lookup data corresponding to the one or more search results. In particular, the system may, through machine learning, associate the search terms with the entries corresponding with the search results that have been determined to have a high level of relevance to the user's search query. For instance, if the user has searched for Manhattan and clicked the top entry in the search results, which was for an office location that is located in Manhattan, the system may form an association between the search term (e.g., "Manhattan") and the top entry (e.g., the office location in Manhattan). It should be understood that the association may be formed even in the absence of the search term in the consolidated lookup data file (e.g., neither the office name nor address contain the word "Manhattan").

In embodiments in which the consolidated lookup data file uses a relational format, the search terms/search query may be appended to the consolidated lookup data file. For example, the search terms/search query may be added to a new column in the same row as the entries with which the search terms/search query is associated, where the new columns are separated (e.g., by a marker or the like) from searchable information to be included in the search results. In other embodiments, the search terms/search query may be added to a new row which may be linked to one or more other rows via a key. In embodiments in which the consolidated lookup data file is stored in a non-relational format (e.g., a graph database), the search terms/search query may be appended to relevant entries through other methods (e.g., a new key-value, new document, new node and edge, or the like). In this way, the system may be able to continuously adapt to subtle variations, nuances, or associations in users' search queries in order to provide the most relevant results in response to the search queries.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for adaptive natural language processing-based electronic file scanning for processing database queries, the system comprising:
 a memory device with computer-readable program code stored thereon;
 a communication device; and
 a processing device operatively coupled to the memory device and the communication device, wherein the processing device is configured to execute the computer-readable program code to:
  extract, using natural language processing, lookup data from one or more data files stored on one or more computing systems in a network;
  aggregate the lookup data into a consolidated lookup data file comprising the lookup data, wherein the consolidated lookup data file is stored in a relational format, wherein associating the search term with the one or more search results comprises appending the search term to a new row, wherein the new row is linked with a row containing the lookup data corresponding with the one or more search results via a key;
  receive a search query from a user computing system, wherein the search query comprises a search term, wherein the search query further comprises a misspelling;
  in response to the search query, display a search output to the user computing system, the search output comprising one or more search results;
  monitor user activity associated with the search output, wherein monitoring user activity comprises tracking an amount of time spent by a user in reviewing the one or more search results and a number of search queries submitted by the user, wherein each of the one or more search results comprises one or more interactive elements configured to receive feedback associated with the one or more search results from the user, wherein the feedback comprises the user marking the one or more search results as relevant or not relevant, wherein the one or more interactive elements are further configured to display additional information associated with the one or more search results, wherein the additional information comprises contact information, location mapping, and directions associated with the one or more search results;
  detect that the user has selected an entry within the one or more search results;
  determine a level of relevance of the one or more search results to the search query based on the user activity, wherein the level of relevance is based on: 1) the amount of time spent by the user in reviewing the one or more search results, 2) the user saving the one or more search results to a list associated with the user; 3) the user accessing the additional information associated with the one or more search results; and 4) the number of search queries submitted by the user, wherein determining the level of relevance of the one or more search results comprises increasing a level of relevance of the entry within the one or more search results to the misspelling based on detecting that the user has selected the entry within the one or more search results; and
  based on the user activity, using adaptive machine learning processes, continuously and dynamically associate the search term with the lookup data corresponding to the one or more search results.

2. The system according to claim 1, wherein the consolidated lookup data file is stored in a relational format, wherein associating the search term with the one or more search results comprises appending the search term to a new column in a row containing the lookup data corresponding with the one or more search results.

3. The system according to claim 1, wherein the user activity comprises at least one of downloading an entry within the one or more search results or viewing metadata associated with the entry.

4. The system according to claim 1, wherein the one or more search results are sorted by relevance to the search query.

5. A computer program product for adaptive natural language processing-based electronic file scanning for processing database queries, the computer program product comprising at least one non-transitory computer readable medium having computer-readable program code portions embodied therein, the computer-readable program code portions comprising executable code portions for:
 extracting, using natural language processing, lookup data from one or more data files stored on one or more computing systems in a network;
 aggregating the lookup data into a consolidated lookup data file comprising the lookup data, wherein the consolidated lookup data file is stored in a relational format, wherein associating the search term with the one or more search results comprises appending the search term to a new row, wherein the new row is linked with a row containing the lookup data corresponding with the one or more search results via a key;
 receiving a search query from a user computing system, wherein the search query comprises a search term, wherein the search query further comprises a misspelling;
 in response to the search query, displaying a search output to the user computing system, the search output comprising one or more search results;
 monitoring user activity associated with the search output, wherein monitoring user activity comprises tracking an amount of time spent by a user in reviewing the one or more search results and a number of search queries submitted by the user, wherein each of the one or more search results comprises one or more interactive elements configured to receive feedback associated with the one or more search results from the user, wherein the feedback comprises the user marking the one or more search results as relevant or not relevant, wherein the one or more interactive elements are further configured to display additional information associated with the one or more search results, wherein the additional information comprises contact information, location mapping, and directions associated with the one or more search results;
 detecting that the user has selected an entry within the one or more search results;
 determining a level of relevance of the one or more search results to the search query based on the user activity, wherein the level of relevance is based on: 1) the amount of time spent by the user in reviewing the one or more search results, 2) the user saving the one or more search results to a list associated with the user; 3) the user accessing the additional information associated with the one or more search results; and 4) the number of search queries submitted by the user, wherein determining the level of relevance of the one or more search results comprises increasing a level of relevance of the entry within the one or more search results to the misspelling based on detecting that the user has selected the entry within the one or more search results; and based on the user activity, using adaptive machine learning processes, continuously and dynamically associating the search term with the lookup data corresponding to the one or more search results.

6. The computer program product according to claim 5, wherein the consolidated lookup data file is stored in a relational format, wherein associating the search term with the one or more search results comprises appending the search term to a new column in a row containing the lookup data corresponding with the one or more search results.

7. The computer program product according to claim 5, wherein the user activity comprises at least one of downloading an entry within the one or more search results or viewing metadata associated with the entry.

8. A computer-implemented method for adaptive natural language processing-based electronic file scanning for processing database queries, wherein the computer-implemented method comprises:

extracting, using natural language processing, lookup data from one or more data files stored on one or more computing systems in a network;

aggregating the lookup data into a consolidated lookup data file comprising the lookup data, wherein the consolidated lookup data file is stored in a relational format, wherein associating the search term with the one or more search results comprises appending the search term to a new row, wherein the new row is linked with a row containing the lookup data corresponding with the one or more search results via a key;

receiving a search query from a user computing system, wherein the search query comprises a search term, wherein the search query further comprises a misspelling;

in response to the search query, displaying a search output to the user computing system, the search output comprising one or more search results;

monitoring user activity associated with the search output, wherein monitoring user activity comprises tracking an amount of time spent by a user in reviewing the one or more search results and a number of search queries submitted by the user, wherein each of the one or more search results comprises one or more interactive elements configured to receive feedback associated with the one or more search results from the user, wherein the feedback comprises the user marking the one or more search results as relevant or not relevant, wherein the one or more interactive elements are further configured to display additional information associated with the one or more search results, wherein the additional information comprises contact information, location mapping, and directions associated with the one or more search results;

detecting that the user has selected an entry within the one or more search results;

determining a level of relevance of the one or more search results to the search query based on the user activity, wherein the level of relevance is based on: 1) the amount of time spent by the user in reviewing the one or more search results, 2) the user saving the one or more search results to a list associated with the user; 3) the user accessing the additional information associated with the one or more search results; and 4) the number of search queries submitted by the user, wherein determining the level of relevance of the one or more search results comprises increasing a level of relevance of the entry within the one or more search results to the misspelling based on detecting that the user has selected the entry within the one or more search results; and based on the user activity, using adaptive machine learning processes, continuously and dynamically associating the search term with the lookup data corresponding to the one or more search results.

9. The computer-implemented method according to claim 8, wherein the consolidated lookup data file is stored in a relational format, wherein associating the search term with the one or more search results comprises appending the search term to a new column in a row containing the lookup data corresponding with the one or more search results.

10. The computer-implemented method according to claim 8, wherein the user activity comprises at least one of downloading an entry within the one or more search results or viewing metadata associated with the entry.

11. The computer-implemented method according to claim 8, wherein the one or more search results are sorted by relevance to the search query.

* * * * *